(12) United States Patent
Kitano et al.

(10) Patent No.: US 7,362,667 B2
(45) Date of Patent: Apr. 22, 2008

(54) OPTICAL INFORMATION REPRODUCTION METHOD AND APPARATUS

(75) Inventors: Emi Kitano, Nara (JP); Masayoshi Nakamura, Osaka (JP); Yoshiyasu Nakayama, Osaka (JP); Yasuo Ueda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 537 days.

(21) Appl. No.: 10/986,300

(22) Filed: Nov. 12, 2004

(65) Prior Publication Data
US 2005/0105410 A1    May 19, 2005

(30) Foreign Application Priority Data
Nov. 14, 2003  (JP) ............................ 2003-384900

(51) Int. Cl.
*G11B 7/00* (2006.01)
(52) U.S. Cl. ................ 369/44.27; 369/53.2; 369/53.28
(58) Field of Classification Search .................... None
See application file for complete search history.

(56) References Cited

U.S. PATENT DOCUMENTS 6,104,019 A * 8/2000 Yokota .................... 250/201.5

2001/0030915 A1    10/2001 Suzuki
2005/0002286 A1 *  1/2005 Yonezawa et al. ....... 369/44.14

FOREIGN PATENT DOCUMENTS

| CN | 1318830 | 10/2001 |
|---|---|---|
| JP | 2001-202632 | 7/2001 |

* cited by examiner

*Primary Examiner*—Wayne Young
*Assistant Examiner*—Adam R. Giesy
(74) *Attorney, Agent, or Firm*—Bacon & Thomas, PLLC

(57) ABSTRACT

In an optical information reproduction apparatus having optical beam sources having at least two types of wavelengths, an object lens may be damaged by colliding with an information recording medium while driving a focus servo, which is caused by a fake signal generated due to an incompatibility of the wavelength in use with the information recording medium. To solve such a problem, in case the type of the information recording medium is unrecognizable and a focus servo is led in by using the optical beam source having the first wavelength, the focus servo is led in by using the second focus servo lead-in unit which is driven by an output of a near focus point detection unit during an operation of a second focus search unit which renders the object lens move away from the information recording medium.

11 Claims, 9 Drawing Sheets

OPTICAL INFORMATION REPRODUCTION METHOD AND APPARATUS

FIELD OF THE INVENTION

The present invention relates to a method and an optical information reproduction apparatus for reading out information from at least two types of information recording media, said apparatus being equipped with an optical pickup having at least two types of light sources having different wavelengths, each of the wavelengths corresponding to each of the information recording media.

BACKGROUND OF THE INVENTION

In a typical optical information reproduction apparatus, an optical beam generated from a source is irradiated onto an information recording medium to produce a reflected optical beam, from which information is read out. To this end, there is provided a focus servo mechanism wherein a focus servo is operated based on an error signal extracted from the reflected optical beam, thereby rendering a focus of the optical beam to follow an information plane on the information recording medium. Additionally, a focus lead-in device is provided to initiate an operation of the focus servo.

Recently, the information recording medium has found increasingly diverse applications, e.g., compact disc (CD), digital versatile disc (DVD), blue-ray disc (BD) and the like and, accordingly, the optical information reproduction apparatus is also required to have a versatile capability of reproducing information recorded on such information recording media.

To meet such requirement, there has been developed an optical pickup for accessing, e.g., both a CD and a DVD, wherein one of two laser diodes is selected depending on the type of information recording medium to be accessed, the two laser diodes providing laser beams of two wavelengths, respectively, i.e., one for the CD and the other for the DVD. However, the information reproduction apparatus is incapable of identifying the type of the information recording medium instantly after the information recording medium is loaded therein; and, consequently, there may occur a mismatching between the type of the optical information recording medium and that of the optical beam used to access it: for instance, the optical beam having the wavelength intended for the DVD may be called upon to access the CD.

To alleviate the problem, therefore, a focus search may be performed before accessing the optical information recording medium such that the type of the information recording medium can be presumed based on the status of a beam reflected therefrom. However, a precise determination of the type of the information recording medium cannot be guaranteed due to, e.g., malfunctioning of the apparatus, surface irregularity or contamination of the media, or time limitation to make a correct decision, resulting in the aforementioned mismatching. Furthermore, in case the wavelength of the optical beam is not compatible with the information recording medium, generation of a desired focus error signal is not guaranteed even by performing the focus search, resulting in a failure of focus lead-in.

Further, in case of accessing, with one optical pickup, a plurality of information recording media, e.g., a CD and a DVD, each having a different depth from a surface thereof to an information recording plane, another problem may arise in that the object lens in the optical pickup may collide with the information recording medium since the mechanical moving range of the object lens may overlap with the range of a warping of the information recording medium and its surface oscillation, thereby causing a failure in the focus lead-in and damaging the object lens and the medium.

To overcome these problems, therefore, there has been proposed a method wherein the focus lead-in is performed only during the focus search in which the object lens is moving in a direction away from the information recording medium (see, e.g., Japanese Patent Laid-Open Application No. 2001-202632 (page 7, FIG. 3)). This related art method will now be explained in detail.

FIG. 7 shows a block diagram of the related art optical information reproduction apparatus. In FIG. 7, reference numeral 1 represents an information recording medium; reference numeral 2, an optical pickup; reference numeral 3, an object lens; reference numeral 6, a focus actuator; reference numeral 7, a focus error signal generation unit; reference numeral 9, a focus servo unit; reference numeral 16, a controller; reference numeral 17, an optical beam source; reference numeral 18, a focus searching unit; reference numeral 19, a servo converting switch; reference numeral 20, a focus servo lead-in unit; and reference numeral 21, a focus zero cross detection unit.

Hereinafter, operation of the conventional optical information reproduction apparatus having the structure described above will be described.

Optical pickup 2, having object lens 3, focus actuator 6 and optical beam source 17, irradiates an optical beam generated from optical beam source 17 onto information recording medium 1, and detects a reflected beam therefrom. Focus error signal generation unit 7 extracts a focus error signal from the reflected beam and provides the focus error signal to focus servo unit 9. Focus servo unit 9 then generates a focus servo signal from the focus error signal.

Focus search unit 18 generates a focus search signal used to control object lens 3 to approach or move away from information recording medium 1. Servo converting switch 19 selects one of the focus search signal and the focus servo signal in accordance with a command from focus lead-in unit 20 so as to provide it to focus actuator 6, such that focus actuator 6 moves the focus of the optical beam in a direction of an optical axis by operating object lens 3 in accordance with an operating voltage applied thereto.

When information recording medium 1 is loaded into the optical information reproduction apparatus, controller 16 performs a focus search wherein focus search unit 18 first generates a focus search signal, which is applied to focus actuator 6 via servo converting switch 19. Focus zero cross detection unit 21 detects a zero crossing of the focus error signal, which is obtained during the focus search, to generate a focus zero cross signal, which is delivered to controller 16. At this time, based on the focus zero cross signal, controller 16 determines that the focus of the optical beam arrives at an information plane of information recording medium 1, and sends an arrival command to focus servo lead-in unit 20. Focus servo lead-in unit 20 then performs a focus lead-in operation by controlling servo converting switch 19 to convert a signal applied to actuator 6 from the focus search signal to the focus servo signal, thereby operating the focus servo. However, as shown in FIG. 8, depending on the combination of the types of optical beam and information recording medium 1, the focus zero cross signal may be a fake signal, i.e., a focus error signal that zero-crosses at a point other than a just focus point. In this case, if the focus lead-in operation is performed in accordance with the fake signal, the focus servo will fail to initiate and, further, the information recording medium and the object lens may be damaged. Accordingly, the focus lead-in operation should be performed only when the focus search is executed on the condition that the fake signal be not generated, i.e., when the focus position of the optical beam move away from information recording medium 1. In this manner, initiation of the focus servo can be performed safely, to thereby avoid a damaging of information recording medium 1 and the object lens.

Referring to FIG. 9, the order of carrying out a proper focus lead-in operation will now be described. In FIG. 9, the focus position of the optical beam moves in a direction along the optical axis, in accordance with the focus search operation of focus actuator 6. The focus error signal which is detected, during the focus search operation, is shown in FIG. 9. First, the focus of the optical beam is made to move away from the information plane of information recording medium 1 by moving object lens 3 away from information recording medium 1. Then, the focus searching direction is reversed such that the focus of the optical beam approaches the information plane of information recording medium 1. At this time, based on a focus zero cross signal, i.e., an output of focus zero cross detection unit 21, it can be detected that the focus of the optical beam has crossed the focus zero cross point, although it is still not clear whether the focus zero cross signal is a fake signal or indicates a crossing of a just focus point. Thereafter, the focus of the optical beam passes beyond the information plane of information recording medium 1 for a predetermined time ΔT. Then, the focus search direction of focus actuator 6 is reversed, such that the focus of the optical beam crosses the information plane of information recording medium 1 and further moves away therefrom. When performing the focus search in that direction, the fake signal is not generated before the focus of the optical beam reaches the just focus point. Therefore, the focus servo can be stably initiated by performing the focus lead-in operation in accordance with the focus zero cross signal outputted from focus zero cross detection unit 21.

However, in such an optical information reproduction apparatus, since the focus lead-in operation is performed during the focus search in which the object lens moves away from the information recording medium, regardless of the wavelength of the optical beam source and the type of medium, there may arise such other problems that are discussed below.

There would occur no problems if the focus error signal without the fake signal or the focus error signal shown in FIG. 8 is generated; however, depending on the combination of the type of information recording medium 1 and the wavelength of the optical beam, the fake signal may be generated when the position of object lens 3 is closer to the information recording medium 1 than that generating the just focus point. In this case, the initiation of the focus servo would fail, damaging the information recording medium 1 and the object lens. These problems may easily occur, in case of a mismatch between the optical information recording medium and the type of optical beam, e.g., the CD being accessed with the optical beam of the wavelength intended for DVD or the DVD being accessed with the optical beam of the wavelength intended for CD, which may result from the lack of accurate information on the type of the information recording medium.

To further illustrate the problem, in case the optical pickup includes two types of optical beam sources accessing the DVD/CD based information recording media, respectively, the wavelengths of which are about 650 nm and about 780 nm, respectively, if the type of the information recording medium is matched with that of the optical beam, e.g., the beam for accessing the DVD is irradiated onto the DVD disc or the beam for accessing the CD is irradiated onto the CD disc, an ideal focus error signal without a fake signal can be obtained as shown in FIG. 2. Or, depending on the structure of the optical pickup, as shown in FIG. 8, a fake signal may be detected at a point far removed from the information recording medium. However, suppose the type of information recording medium is not compatible with that of the optical beam, e.g., the optical beam to access the DVD being irradiated onto the CD disc or the beam to access the CD being irradiated onto the DVD disc: for instance, in the former case, a fake signal might be detected at a point removed from the information recording medium, due to the oscillating profile of the focus error signal prior to reaching the just focus point, as shown in FIG. 3. Further, in the latter case, a fake signal might be generated at a point close to the information recording medium, due to the oscillating profile of the focus error signal after passing the just focus point, as shown in FIG. 5.

Therefore, even when the focus lead-in operation is performed during the focus search while the object lens is moving away from the information recording medium, if the focus servo is tried to be led in by using an optical beam which is not compatible with the information recording medium, there still exists a possibility that the initiation of the focus servo may fail due to the fake signal and, the information recording medium 1 or the object lens may be damaged.

Further, since the focus error signal, which is obtained when the type of the information recording medium is not compatible with that of the optical beam, is not originally intended to be used with the optical pickup, it is possible that such signals are not defined in the specification of the optical pickup. Therefore, no inspection thereof can be performed when manufacturing the optical pickup. Accordingly, even when the wavelength of the optical beam source is determined based upon the type of the information recording medium, which is presumed by performing the focus search right after loading the information recording medium into the optical information reproduction apparatus, a mismatching may still occur between the types of the information recording medium and the optical beam. In the worst case, the initiation of the focus servo may fail and further the information recording medium 1 and the object lens may be damaged.

On the other hand, in order to obtain an ideal focus error signal without a fake signal, if the focus lead-in operation is performed by executing the focus search in a direction moving away from information recording medium 1 after the focus of the optical beam crosses the just focus point, such would require a longer period of time in initiating the focus servo.

In contrast, if the just focus point is detected while the focus search is executed in a direction of moving the object lens toward the information recording medium, since the direction of the focus search is reversed only after a predetermined time, even if the focus of the optical beam has passed the just focus point, the object lens may approach too close to the information recording medium and, in a worst case, collide with it, if the speed of the focus search becomes too fast.

On the other hand, if the focus search speed is adjusted to be slow to avoid the collision, the time required to initiate the focus servo would be not only extended but also the speed of the focus search would not render it possible to follow an up-and-down movement of the information plane of the information recording medium caused by, e.g., a surface irregularity of the information recording medium, thereby failing a proper focus lead-in operation and increasing the risk of initiation failure of the focus servo.

SUMMARY OF THE INVENTION

It is, therefore, a primary object of the present invention to provide an optical information reproduction apparatus capable of securely performing a focus lead-in operation without damaging an information recording medium or an object lens due to a failure to initiate a focus servo, even if a fake signal is generated, e.g., in case the wavelength of an optical beam source is not compatible with the type of the information recording medium which is not known in advance and also reducing the time required to perform the focus lead-in operation by increasing the speed of a focus search, without increasing the risk of collision between the object lens and the information recording medium.

It is another object of the present invention to provide a method for reading out information from at least two types of information recording media by using an optical reproduction apparatus which is equipped with an optical pickup having at least two types of light sources generating optical beams having different wavelengths, each of the wavelengths corresponding to each of the information recording media.

In accordance with the present invention, there is provided an optical information reproduction apparatus including: an optical pickup including: optical beam sources for generating optical beams having at least a first and a second wavelengths for accessing at least a first and a second information recording media, respectively, an object lens for focusing an optical beam generated from one of the optical beam sources and irradiating the optical beam to one of the information recording media, and a focus actuator for operating the object lens in a direction of an optical axis of the optical beam; a focus servo unit for controlling a position of the object lens, to thereby move the focus of the optical beam to a just focus point where the focus of the optical beam meets with an information recording surface of the information recording medium; a first focus search unit for controlling the object lens to move toward the information recording medium; a second focus search unit for controlling the object lens to move away from the information recording medium; a first focus servo lead-in unit for converting an operation of the first focus search unit to an operation of the focus servo unit during the operation of the first focus search unit; and a second focus servo lead-in unit for converting an operation of the second focus search unit to an operation of the focus servo unit during the operation of the second focus search unit, wherein, if a focus servo is led in by using the optical beam having the first wavelength, the focus servo is led in by using the second focus servo lead-in unit.

In accordance with another aspect of the present invention, there is provided an optical information reproduction method for reading out information from a plurality of information recording media, comprising the steps of: emitting one of optical beams having at least a first and a second wavelengths for accessing at least a first and a second information recording media, respectively; focusing and irradiating the emitted optical beam by using an object lens onto one of the information recording media; detecting a reflected optical beam from said one of the optical recording media; controlling a position of the object lens by generating a focus servo signal, to thereby move the focus of the optical beam to a just focus point where the focus of the optical beam meets with an information recording plane of said one of the information recording media; generating a first and a second focus search control signals, a search converting switch control signal, and a first and a second focus servo lead-in control signals; performing a first focus search operation by moving the object lens toward said one of the information recording media by generating a first focus search signal based on the first focus search control signal; performing a second focus search operation by moving the object lens away from said one of the information recording media by generating a second focus search signal based on the second focus search control signal; selecting a signal between the first and the second focus search signals based on the search converting switch control signal; generating a first focus ON signal based on the first focus servo lead-in control signal during the first focus search operation; generating a second focus ON signal based on the second focus servo lead-in control signal during the second focus search operation; selecting an output between the selected signal and the focus servo signal based on one of the first and the second focus ON signals, and supplying the output to a focus servo actuator; and operating the object lens in a direction of an optical axis of the optical beam based on the output supplied to the focus servo actuator, wherein, if a focus servo is led in by using the optical beam having the first wavelength, the focus servo is led in by using the second focus ON signal.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

Figure 1:
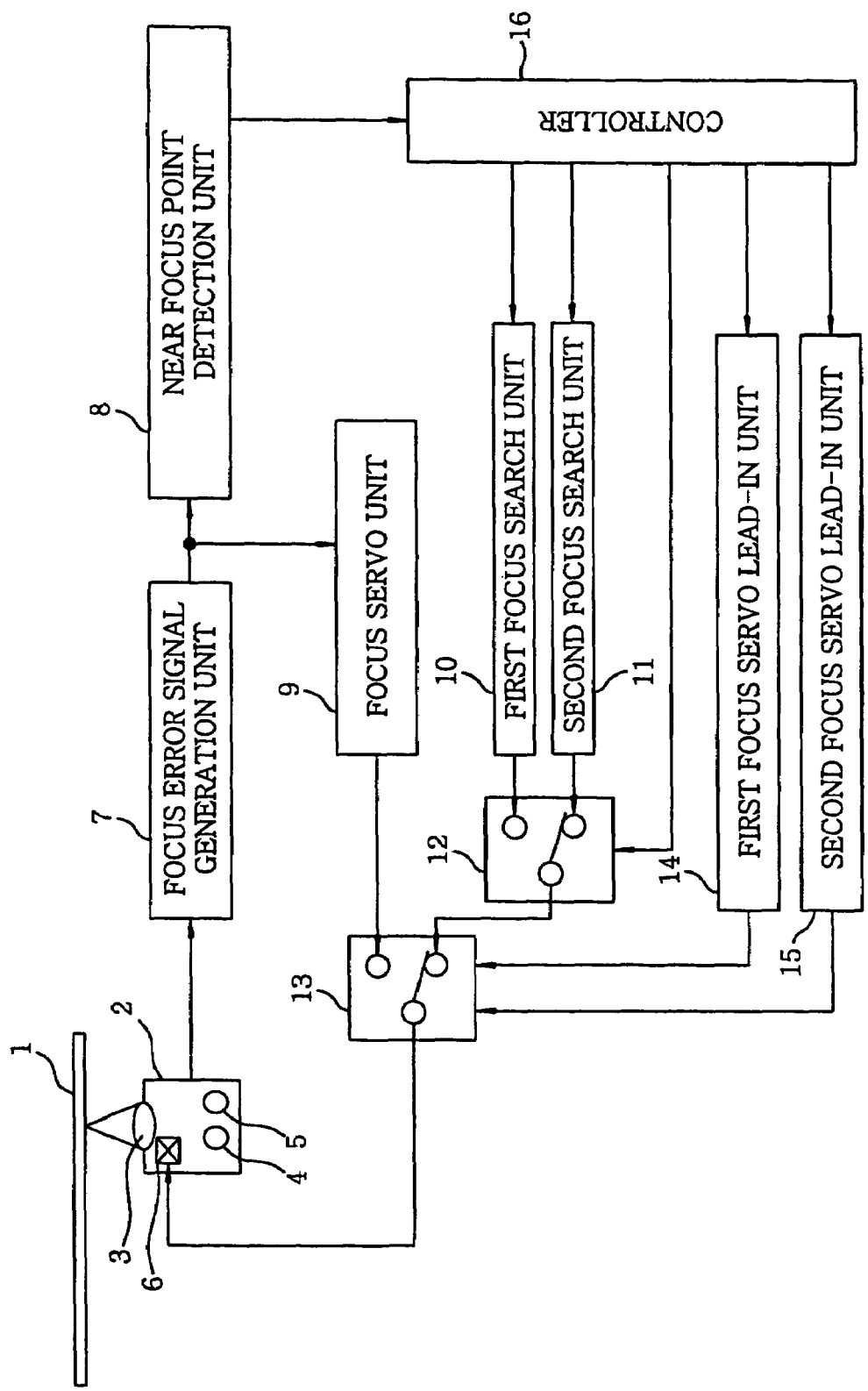
FIG. 1 shows a block diagram of an optical information reproduction apparatus in accordance with a preferred embodiment of the present invention.
Figure 6:
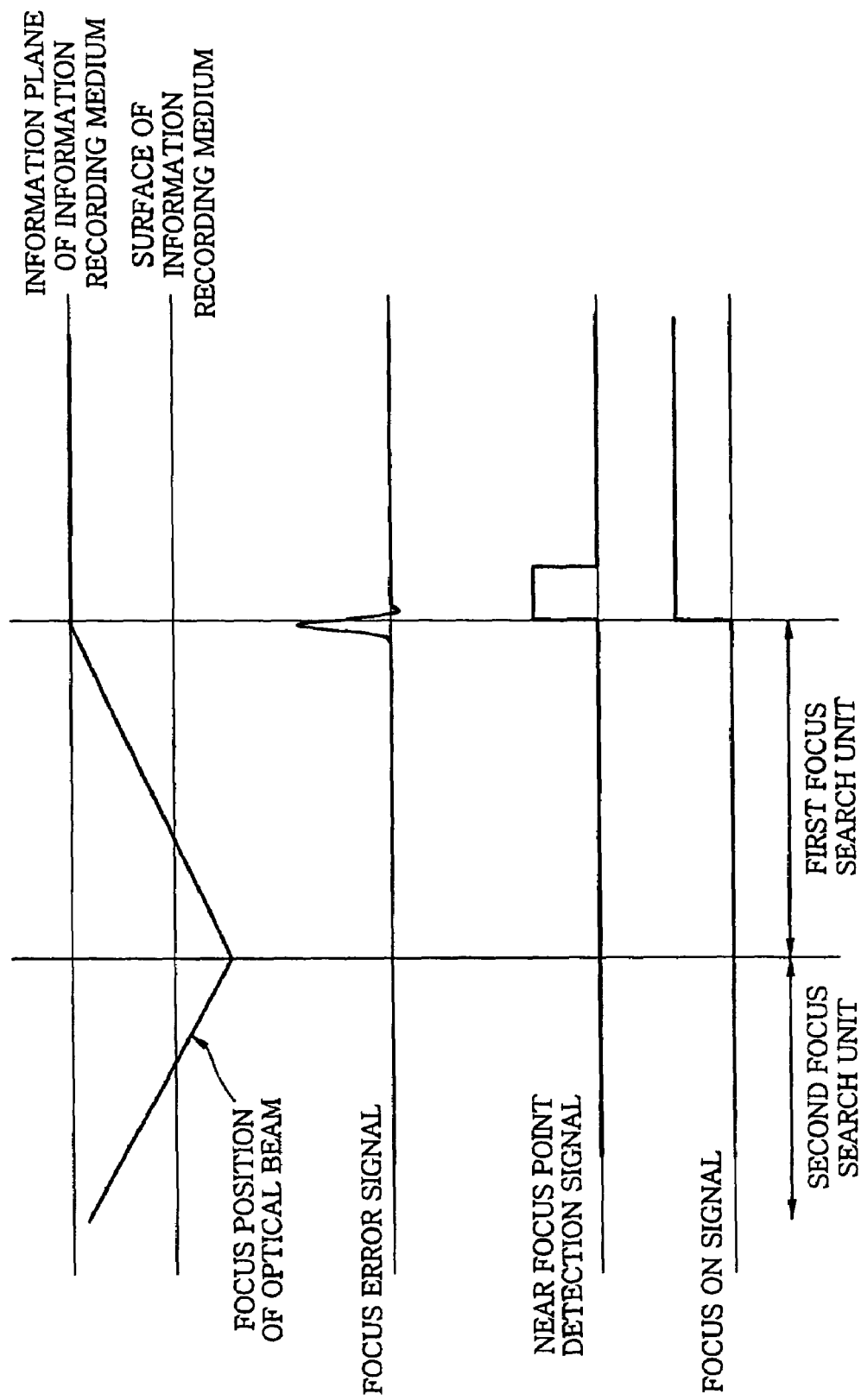
FIG. 6 represents another method of performing a focus lead-in operation in accordance with the preferred embodiment of the present invention.
Figure 7:
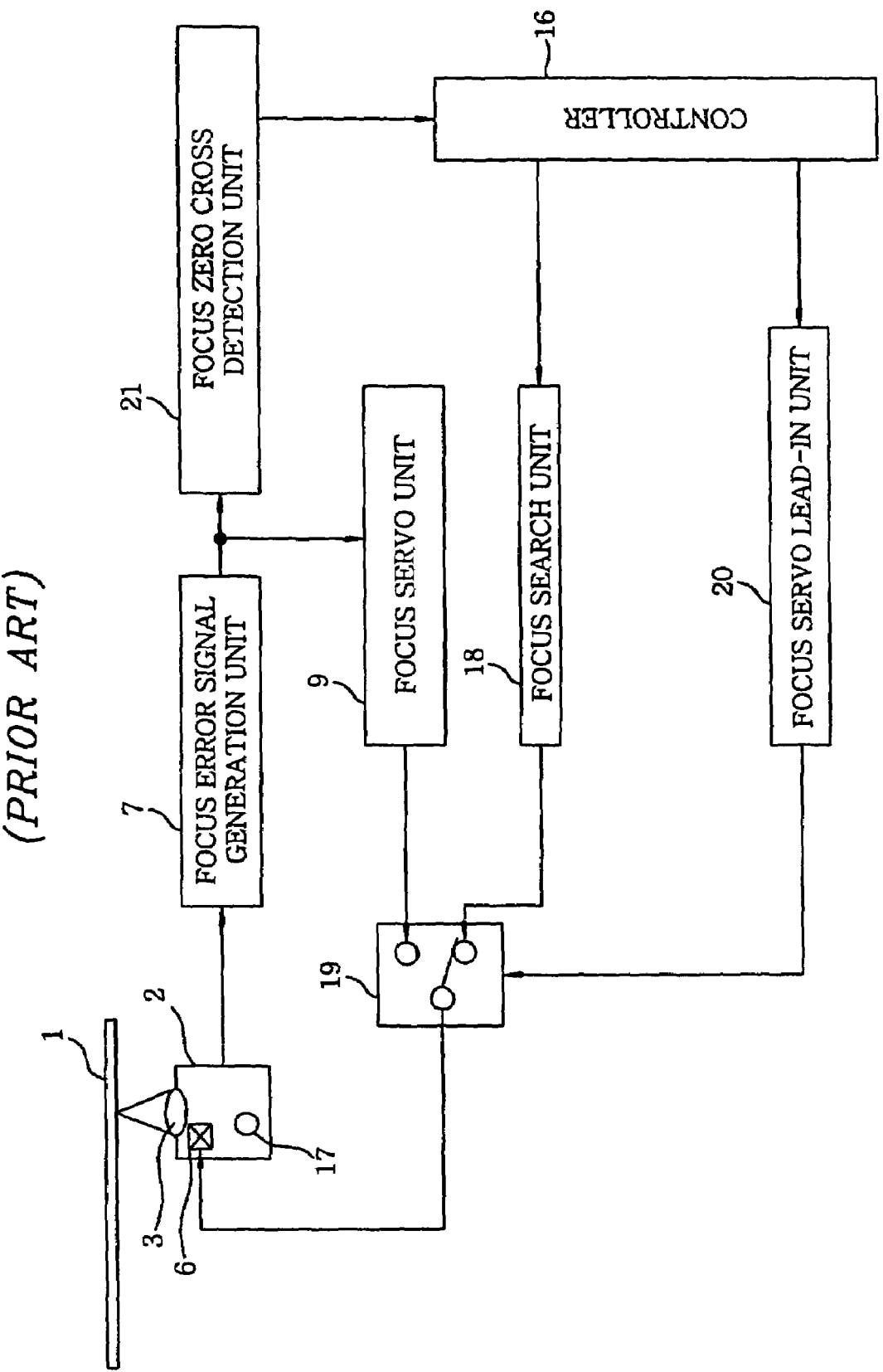
FIG. 7 provides a block diagram of a conventional information reproduction apparatus.
Figure 8:
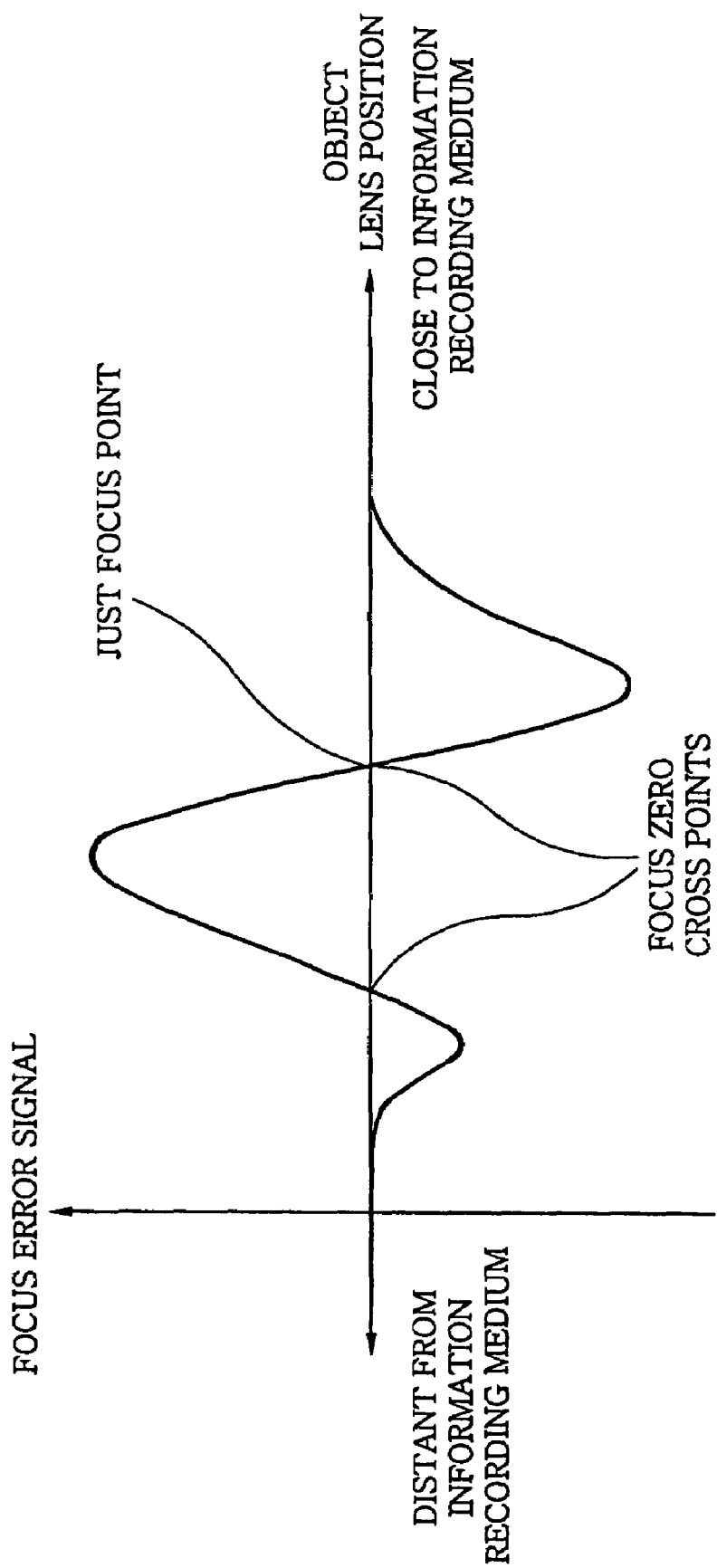
FIG. 8 exhibits a waveform of a focus error signal having a fake signal generated in accordance with the related art.
Figure 9:
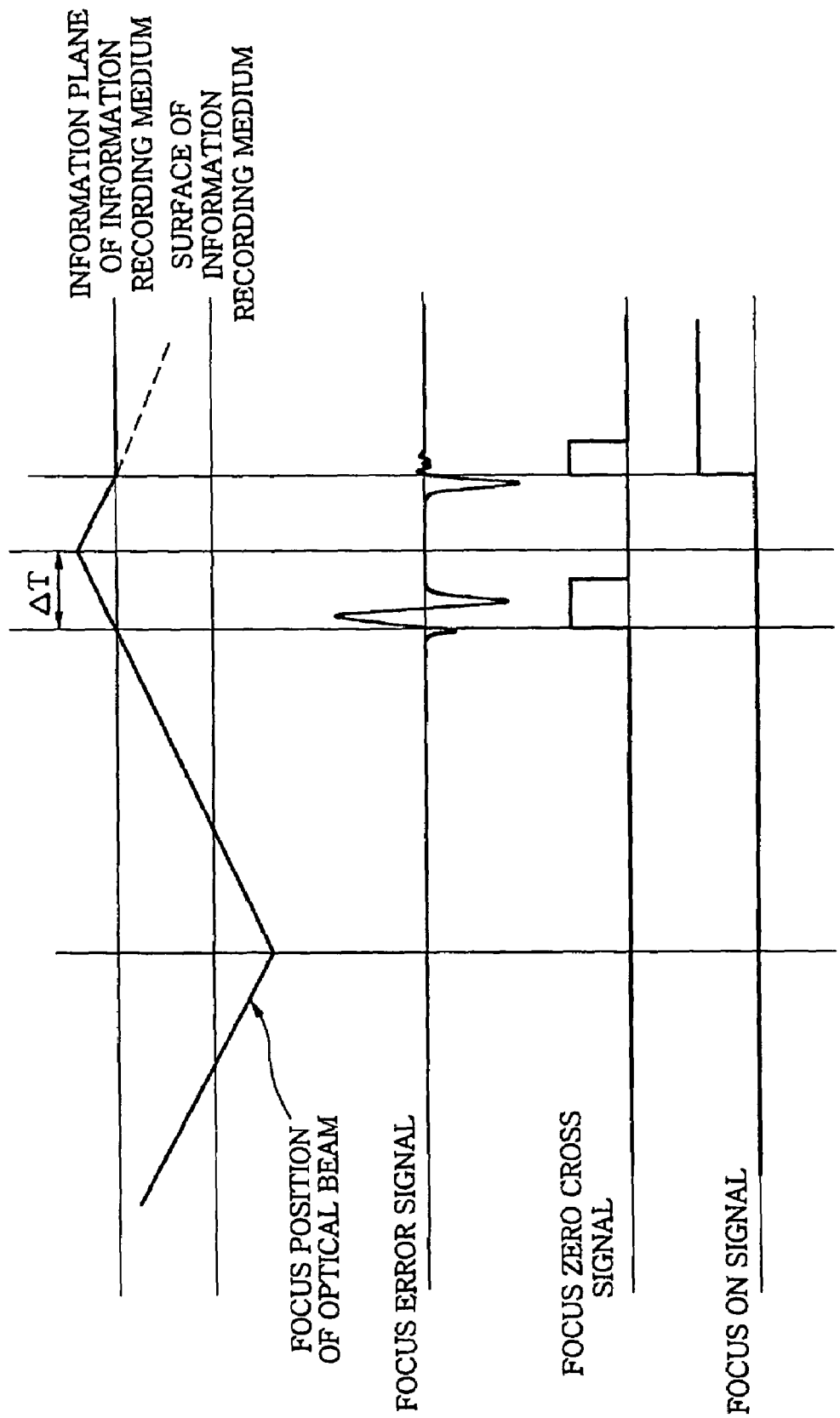
FIG. 9 offers a conventional method of performing a focus lead-in operation.

Referring to FIGS. 1 and 6, there will be described an optical information reproduction apparatus in accordance with a preferred embodiment of the present invention, including an optical beam source providing optical beams having two types of wavelengths, e.g., a first and a second wavelengths for reading out an information from two types of the information recording media, e.g., a first and a second information recording media, respectively.

FIG. 1 shows a block diagram of the optical information reproduction apparatus in accordance with the preferred embodiment of the present invention. Referring to FIG. 1, numerical reference 1 indicates an information recording medium; numerical reference 2, an optical pickup; numerical reference 3, an object lens; numerical reference 4, an optical beam source emitting an optical beam having a first wavelength; numerical reference 5, an optical beam source emitting an optical beam having a second wavelength; numerical reference 6, a focus actuator; numerical reference 7, a focus error signal generation unit; numerical reference 8, a near focus point detection unit; numerical reference 9, a focus servo unit; numerical reference 10, a first focus search unit; numerical reference 11, a second focus search unit; numerical reference 12, a search converting switch; numerical reference 13, a servo converting switch; numerical reference 14, a first focus servo lead-in unit; numerical reference 15, a second focus servo lead-in unit; and numerical reference 16, a controller.

Operation of the optical information reproduction apparatus having the above-described configuration will now be described. First, optical pickup 2 includes object lens 3, focus actuator 6, optical beam source 4 emitting an optical beam having the first wavelength and optical beam source 5 providing an optical beam having the second wavelength. In optical pickup 2, one of the optical beams generated by optical beam source 4 having the first wavelength and optical beam source 5 having the second wavelength are focused through object lens 3 to be irradiated onto information recording medium 1 and, the reflected light is detected. Focus error signal generation unit 7 detects the focus error signal from the reflected light and delivers it to both near focus point detection unit 8 and focus servo unit 9. Near focus point detection unit 8 detects a focus of the optical beam located in a neighborhood of a just focus point, to output a near focus point detection signal to controller 16. Focus servo unit 9 generates a focus servo signal from the focus error signal and supplies it to the servo converting switch 13. First focus search unit 10 generates a focus search signal for controlling object lens 3 to approach information recording medium 1, and second focus search unit 11 generates a focus search signal for moving object lens 3 away from information recording medium 1. Search converting switch 12 selects one of the signals from the first and the second focus search units 10 and 11 in accordance with a command of controller 16, and supplies it to servo converting switch 13. First focus servo lead-in unit 14 sends a focus ON signal to servo converting switch 13 in accordance with a control signal outputted from controller 16 when the focus servo is led in based on an output of the near focus point detection unit during an operation of first focus search unit 10. Second focus servo led in unit 15 sends another focus ON signal to servo converting switch 13 in accordance with a control signal outputted from controller 16 when the focus servo is led in based on an output of the near focus point detection unit during an operation of second focus search unit 11. Further, servo converting switch 13 selects one of the focus search signal and the focus servo signal based on the focus ON signals and then supplies it to focus actuator 6. Focus actuator 6 then moves the focus of the optical beam along an optical axis by operating object lens 3 based on an operational voltage applied thereto.

Figure 2:
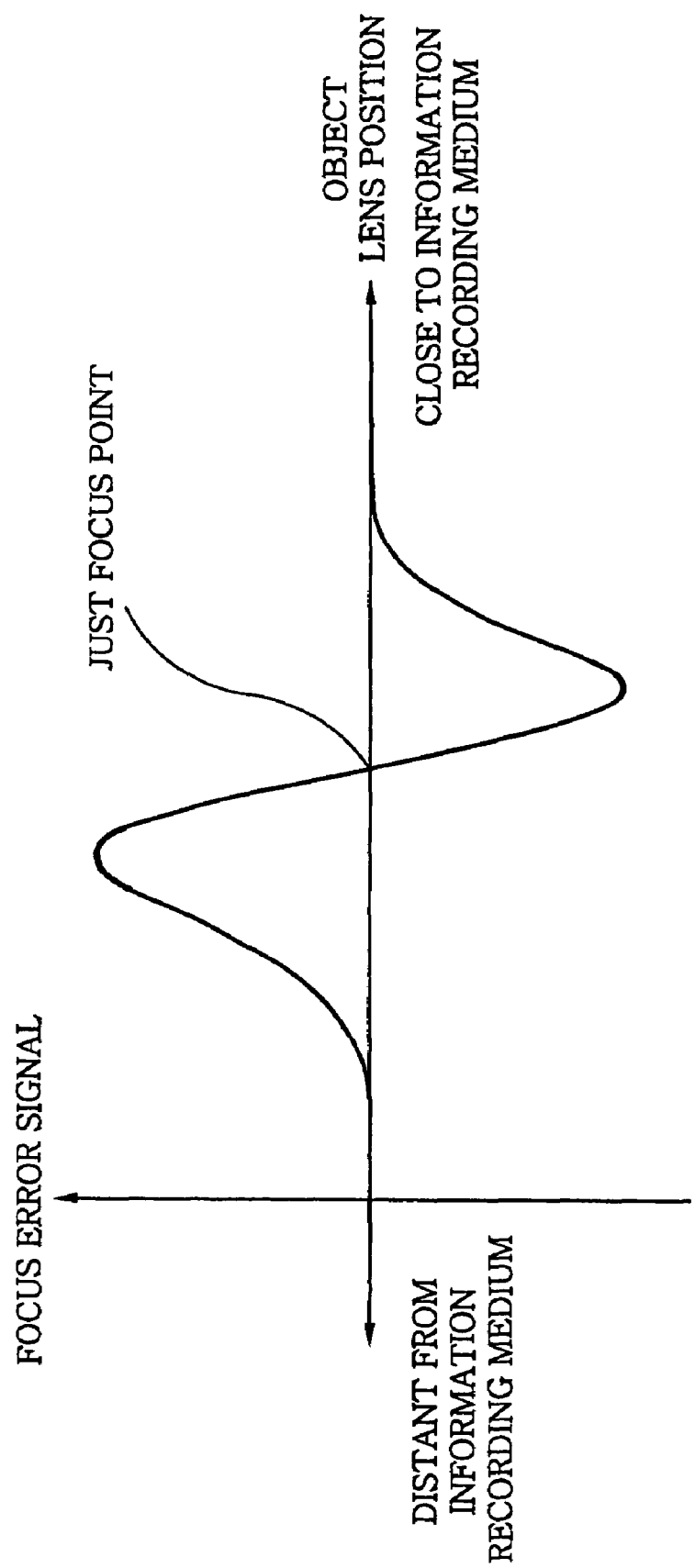
FIG. 2 presents a focus error signal waveform (ideal focus error signal waveform without a fake signal) obtained when a first type of information recording medium is accessed by employing optical beam source 4 having a first wavelength.

Hereinafter, there will be described an operation of the optical information reproduction apparatus having the above-described configuration, under the assumption that optical beam source 4 having the first wavelength has the wavelength of about 650 nm for accessing a DVD based information recording medium, and optical beam source 5 having the second wavelength has the wavelength of about 780 nm for accessing a CD based information recording medium. If information recording medium 1 is loaded into the optical information reproduction apparatus, controller 16 turns on optical beam source 4 having the first wavelength, while it is uncertain whether information recording medium 1 is the DVD or the CD disc. Alternatively, optical beam source 5 having the second wavelength may be turned on first, however, in this case, the sequence of operations to be described below would be different from the case of turning on first the optical beam source having the first wavelength. Further, controller 16 generates a focus search signal to be supplied to first focus search unit 10 or second focus search unit 11, an output thereof being applied to focus actuator 6 via the search converting switch 12 and servo converting switch 13, to thereby perform a focus search. In this case, if information recording medium 1 is a DVD disc, since optical beam source 4 having the first wavelength is compatible with the type of information recording medium 1, a focus error signal having an ideal waveform as shown in FIG. 2 can be obtained. In this case, the focus servo can be operated stably irrespective of the direction of the focus search.

Figure 3:
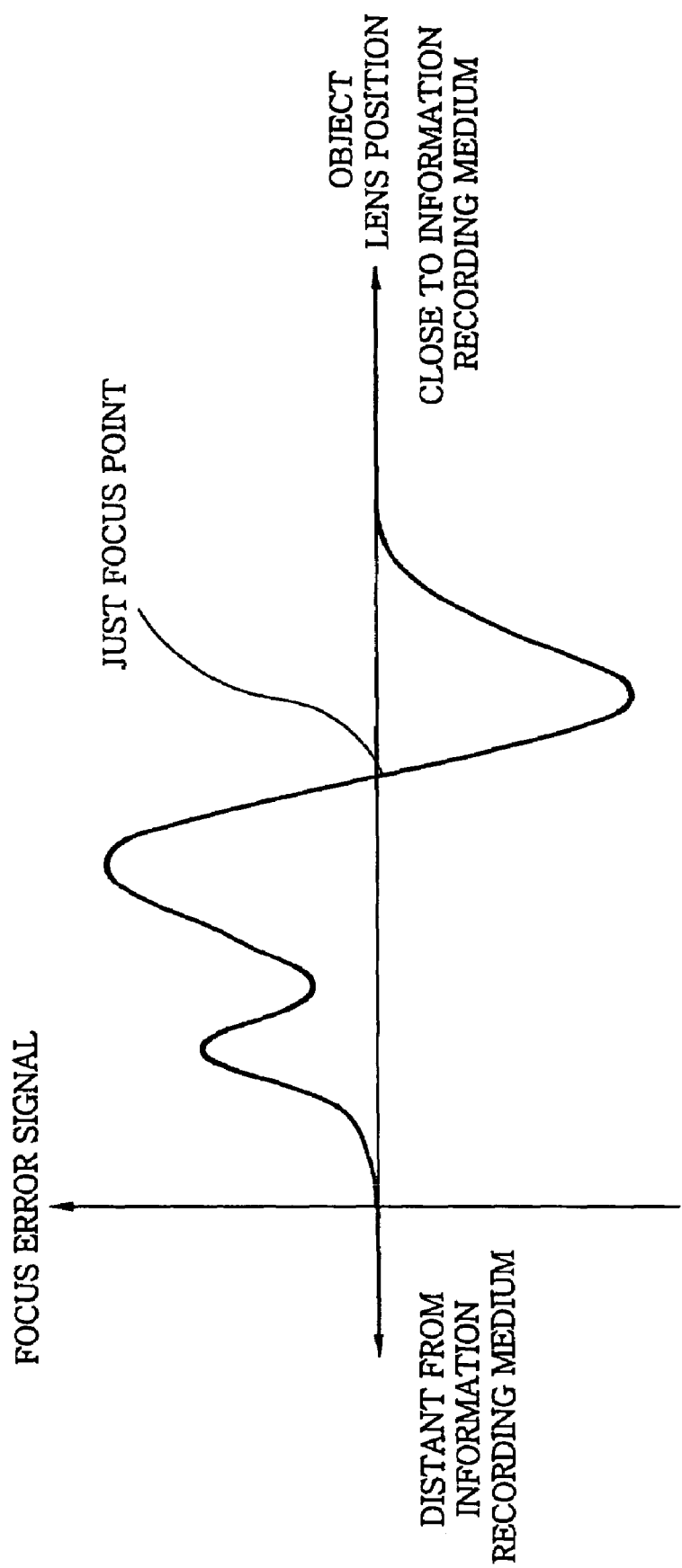
FIG. 3 illustrates a focus error signal waveform obtained when a second type of information recording medium is accessed by employing optical beam source 4 having a first wavelength.

If the information recording medium 1 is a CD disc, however, since the wavelength of the optical beam source is not compatible with the type of information recording medium 1, a focus error signal with a fake signal is generated, as shown in FIG. 3. Since the fake signal is generated accidentally due to an erroneous access of the CD disc with a beam having a wavelength for DVD, the waveform of the focus error signal including the locations of the fake signal and the zero cross point is not generally predictable. Since, however, the fake signal is generated due to the mismatch between the wavelength of the optical beam and the depth of the information recording medium, the fake signal would be generated when the location of object lens 3 is farther from the information recording medium than the location of object lens 3 when the just focus point is detected. Nonetheless, there is a possibility that the information recording medium has a surface irregularity or contamination thereon, such that the type of the information recording medium, i.e., whether it is the DVD or the CD disc, may not be accurately identifiable from the focus error signal. Therefore, if optical beam source 4 having the first wavelength, which is used for accessing a DVD disc, i.e., about 650 nm, is employed, but if a CD disc is loaded into the optical information reproduction apparatus, the focus lead-in operation should be performed during the focus search wherein no fake signal is generated or when object lens 3 moves far from information recording medium 1.

Figure 4:
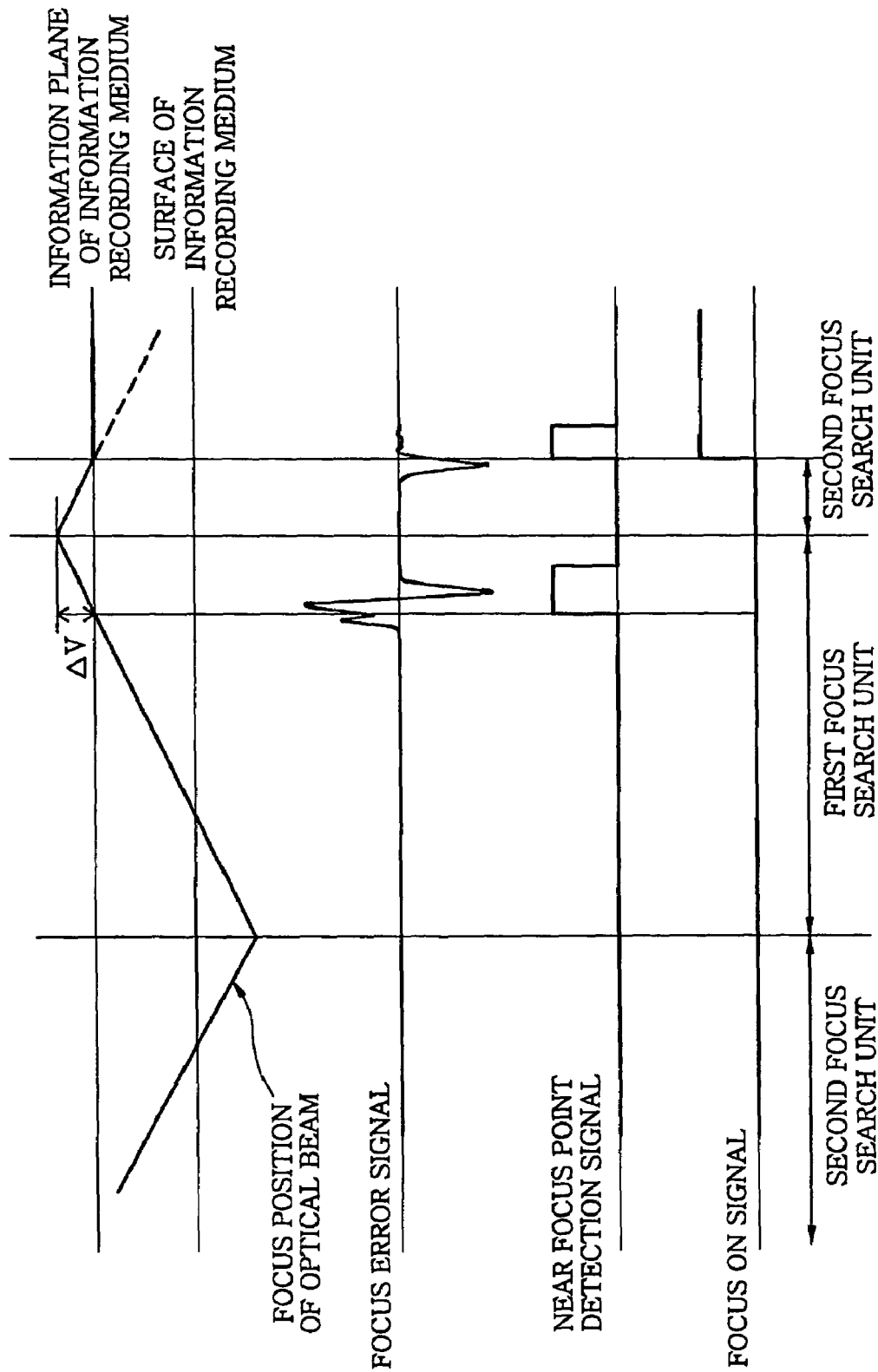
FIG. 4 depicts a method of performing a focus lead-in operation in accordance with the preferred embodiment of the present invention.

Referring to FIG. 4, there will be explained a focus lead-in operation of the optical information reproduction apparatus using optical beam source 4 having the first wavelength of about 650 nm intended for use in accessing a DVD disc, while a CD disc is loaded thereto. As shown in FIG. 4, the focus of the optical beam moves up and down in the direction of the optical axis in accordance with the search operation of focus actuator 6. Referring to the focus error signal shown in FIG. 4, the second focus search unit 11 controls the focus of the optical beam to move away from the information plane of information recording medium 1. Next, by using first focus search unit 10, the direction of the focus search is reversed, i.e., the focus of the optical beam moves toward the information plane of information recording medium 1. Thus, the focus of the optical beam approaches the information plane of information recording medium 1, such that near focus point detection unit 8 outputs a near focus point detection signal. However, in case information recording medium 1 is a CD disc, a near focus point detection signal is generated due to a fake signal and controller 16 controls focus servo lead-in unit 14 not to operate such that the focus lead-in operation is not performed. Further, the first focus search is continued until the focus search signal is changed by up to a predetermined voltage $\Delta V$, i.e., until object lens 3 comes close to information recording medium 1 by a certain distance corresponding to the predetermined voltage $\Delta V$ to thereby move the focus of the optical beam beyond the information plane. Thereafter, controller 16 controls search converting switch 12 to switch the focus search signal from an output of first focus search unit 12 to that of second focus search unit 11. Thus, object lens 3 becomes distant from information recording medium 1 and accordingly the focus of the optical beam moves away from information recording medium 1. Further, second focus servo lead-in unit 15 operates during the second focus search. That is, the focus ON signal is delivered from second focus servo lead-in unit 15 to servo converting switch 13, which is driven by a control signal outputted from controller 16 based on an output of near focus point detection unit 8, thereby leading in the focus servo. In this way, although optical beam source 4 having the first wavelength of about 650 nm for accessing a DVD disc is used to access a CD disc, the focus lead-in can be performed stably, even in case a fake signal as shown in FIG. 3 is generated.

On the other hand, if a DVD disc is loaded into the optical information reproduction apparatus, an ideal focus error signal without a fake signal as shown in FIG. 2 can be obtained, thereby performing the focus lead-in stably. As described above, regardless of whether optical beam source 4 having the first wavelength is used to access a CD disc or a DVD disc, the focus error signal obtained during the second focus search can be used to execute a stable focus lead-in operation, since there is no fake signal generated before the focus of the optical beam reaches the just focus point.

The predetermined voltage $\Delta V$ may be set to a value corresponding to such a distance that the focus position of the optical beam passes through the information plane of the information recording medium 1 during the first focus search. In other words, the predetermined voltage $\Delta V$ is preferably set such that object lens 3 does not collide with information recording medium 1 during the focus search. In this way, the direction of the focus search can be reversed stably without increasing the risk of collision between object lens 3 and information recording medium 1, irrespective of the speed of the focus search.

Figure 5:
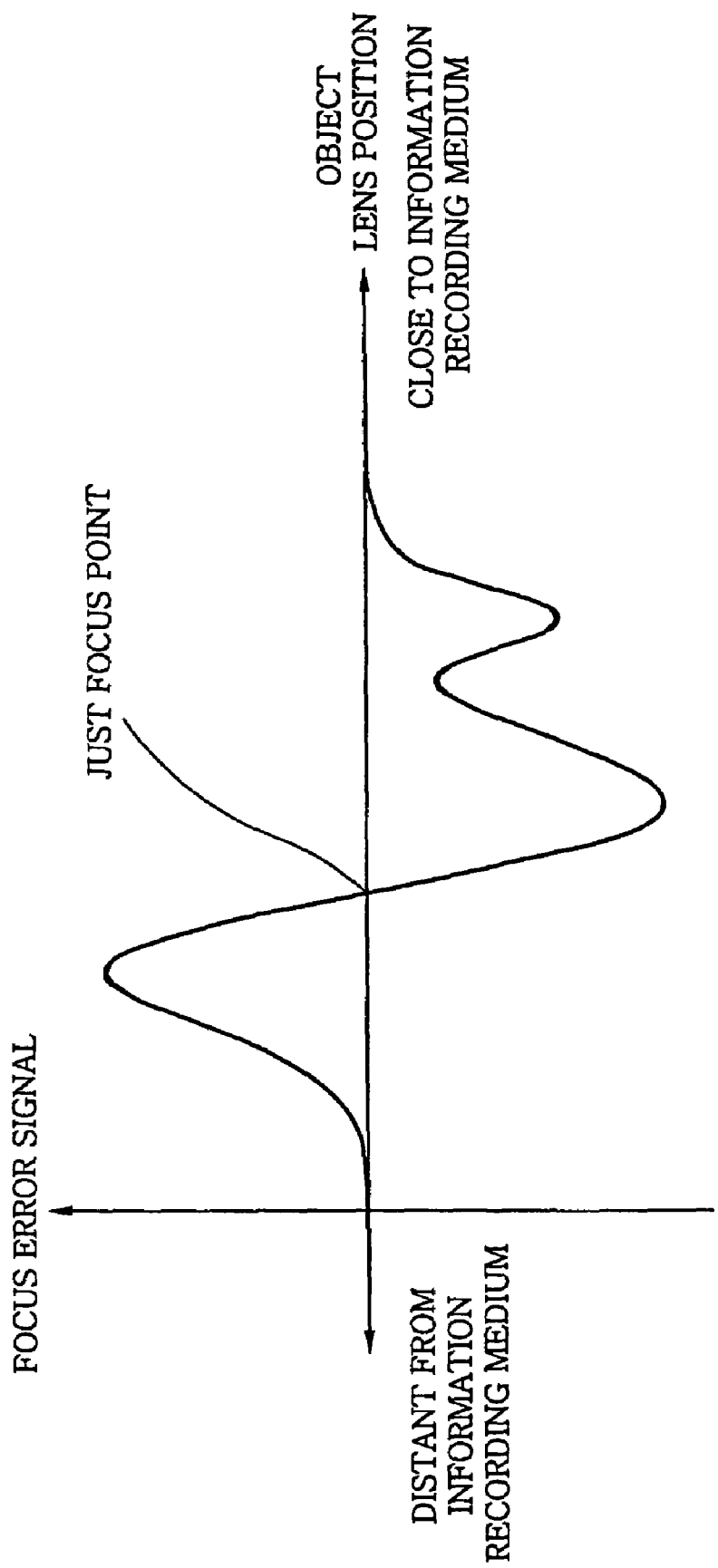
FIG. 5 describes a focus error signal waveform obtained when the first type of information recording medium is accessed by employing optical beam source 5 having a second wavelength.

Next, in case the information recording medium is a DVD disc in spite of using optical beam source 5 having the second wavelength of about 780 nm intended for use in accessing a CD disc, there will occur fake signal as shown in FIG. 5. As mentioned above, the occurrence of a fake signal is generally unpredictable. Since, however, the fake signal is generated due to a mismatch between the wavelength of a optical beam and a depth of the information recording medium, the fake signal would be generated when object lens 3 is closer to the information recording medium than the location of object lens 3 corresponding to the just focus point. Accordingly, in case optical beam source 5 having the second wavelength, i.e., about 780 nm for accessing a CD disc is used to access a DVD disc, the focus search during the focus lead-in operation should be performed in a direction of preventing the occurrence of fake signal, i.e., in a direction of rendering the position of object lens 3 moving close to information recording medium 1, as shown in FIG. 5. Referring to FIG. 6, such a focus lead-in operation will be described.

As shown in FIG. 6, the position of the focus of the optical beam moves up and down in the direction of the optical axis in accordance with the search operation of focus actuator 6. As shown in FIG. 6, first, the focus of the optical beam moves farther from the information plane of the information recording medium 1 than the just focus point, by moving object lens 3 away from the information recording medium, which is driven by second focus search unit 11. Next, by reversing the search direction of the focus search using first focus search unit 10, the focus of the optical beam moves toward the information plane of information recording medium 1. If the focus of the optical beam approaches a neighborhood of the information plane of information recording medium 1, the focus error signal is transformed, such that the near focus point detection unit 8 outputs a near focus point detection signal. In case optical beam source 5 having the second wavelength of about 780 nm for accessing a CD disc is used, regardless of whether information recording medium 1 is a CD or a DVD disc, the focus error signal obtained during the first focus search can lead to a stable focus lead-in operation, since there would be no fake signal generated before the focus of the optical beam reaches the just focus point.

In accordance with the embodiment described above, in case the optical beam source having the first wavelength is used, irrespective of the type of the information recording medium employed, the focus servo is led in by using the second focus servo lead-in unit. In this way, it is possible to prevent the detection of a fake signal and to securely perform the focus lead-in operation, thereby overcoming the various deficiencies in the conventional technology.

Further, when the optical beam source having the second wavelength is used, irrespective of the type of the information recording medium employed, the focus servo is properly led in by using the first focus servo lead-in unit, to thereby rectify the problems of the conventional technology.

Furthermore, in case the type of information recording medium 1 is identified, one of optical beam source 4 having the first wavelength and optical beam source 5 having the second wavelength is selected based on the identified type of the information recording medium. Accordingly, a focus error signal without a fake signal can be obtained as described above, so that the focus lead-in operation can be performed by operating the first focus servo lead-in unit during the first focus search. Therefore, the related art problem of requiring extra time to initiate the focus servo can be efficiently resolved.

Further, in accordance with the present invention, the related art problem of collision between the object lens and the information recording medium can be avoided.

It should be noted that, the above-described embodiment is merely an exemplary illustration of the present invention, and is not intended to limit the present invention thereby. For instance, in the embodiment, the first and the second types of the information recording media may be a DVD disc and a CD disc, respectively, and vice versa. This may be also applied to a case of the first and the second optical beam sources. Further, the present invention may be applied to other information recording media and a modification of the embodiment may be made thereto in accordance with characteristics of the optical beam source employed therein.

The above-described near focus point detection unit detects that the focus of the optical beam is located in a neighborhood of the just focus point in accordance with a variation of the focus error signal. However, the near focus point detection unit may be implemented by employing a focus zero cross detection unit which detects that the focus error signal varies when crossing a reference point. Or, the near focus point detection may be performed by detecting a variation in the amount of a reflected light outputted from the optical pickup.

Further, in case the type of the information recording medium is identified, one of optical beam source 4 having the first wavelength and optical beam source 5 having the second wavelength is selected based on the identified type of the information recording medium. Accordingly, the focus error signal without a fake signal can be obtained as described above, so that the focus lead-in operation may be performed by operating the first focus servo lead-in unit during the first focus search or by operating the second focus servo led in unit during the second focus search. This method is particularly effective when the focus servo is selectively lead-in to one of the information planes of information recording medium 1, e.g., a DVD disc having a plurality of information planes. Further, the present invention has been described with respect to accessing an optical disc, however, the present invention may be similarly applied to an optical magnetic disc or a transmission typed optical information reproduction apparatus.

While the invention has been shown and described with respect to the preferred embodiments, it will be understood by those skilled in the art that various changes and modifications may be made without departing from the spirit and scope of the invention as defined in the following claims.

What is claimed is:

1. An optical information reproduction apparatus comprising:
   an optical pickup including:
      optical beam sources for generating optical beams having at least a first and a second wavelengths for accessing at least a first and a second information recording media, respectively,
      an object lens for focusing an optical beam generated from one of the optical beam sources and irradiating the optical beam to one of the information recording media, and
      a focus actuator for operating the object lens in a direction of an optical axis of the optical beam;
   a focus servo unit for controlling a position of the object lens, to thereby move the focus of the optical beam to a just focus point where the focus of the optical beam meets with an information recording surface of said one of the information recording media;
   a first focus search unit for controlling the object lens to move toward said one of the information recording media;
   a second focus search unit for controlling the object lens to move away from said one of the information recording media;
   a first focus servo lead-in unit for converting an operation of the first focus search unit to an operation of the focus servo unit during the operation of the first focus search unit; and a second focus servo lead-in unit for converting an operation of the second focus search unit to an operation of the focus servo unit during the operation of the second focus search unit,
   wherein, if a focus servo is led in by using the optical beam having the first wavelength, the focus servo is led in by using the second focus servo lead-in unit, and if the focus servo is led in by using the optical beam having the second wavelength, the focus servo is led in by using the first focus servo lead-in unit, and
   wherein the first wavelength of the optical beam source is different from the second wavelength of the optical beam source.

2. The optical information reproduction apparatus of claim 1, wherein, in case the type of the information recording medium is identified, the focus servo is led in by using either the first or the second focus servo lead-in unit by employing the optical beam having a wavelength corresponding to the type of said one of the information recording media.

3. The optical information reproduction apparatus of claim 1, wherein the first wavelength of the optical beam source is shorter than the second wavelength of the optical beam source.

4. The optical information reproduction apparatus of claim 1, wherein the first information recording medium is a digital versatile disc (DVD), and the optical beam source of the first wavelength has a wavelength of about 650 nm to access the DVD.

5. The optical information reproduction apparatus of claim 1, wherein the second information recording medium is a compact disc (CD), and the optical beam source of the second wavelength has a wavelength of about 780 nm to access the CD.

6. The optical information reproduction apparatus of claim 1, wherein the conversion from the output of the first focus search unit to the output of the second focus search unit is performed after, upon detecting that the focus of the optical beam is located at a near focus point during an operation of the first focus search unit, the object lens has approached said one of the information recording media from the near focus point within a predetermined distance by increasing an operational voltage of the focus actuator.

7. An optical information reproduction method for reading out information from a plurality of information recording media, comprising the steps of:
   emitting one of optical beams having at least a first and a second wavelengths for accessing at least a first and a second information recording media, respectively;
   focusing and irradiating the emitted optical beam by using an object lens onto one of the information recording media;
   detecting a reflected optical beam from said one of the optical recording media;
   controlling a position of the object lens by generating a focus servo signal, to thereby move the focus of the optical beam to a just focus point where the focus of the optical beam meets with an information recording plane of said one of the information recording media;
   generating a first and a second focus search control signals, a search converting switch control signal, and a first and a second focus servo lead-in control signals;
   performing a first focus search operation by moving the object lens toward said one of the information recording media by generating a first focus search signal based on the first focus search control signal;

performing a second focus search operation by moving the object lens away from said one of the information recording media by generating a second focus search signal based on the second focus search control signal;

selecting a signal between the first and the second focus search signals based on the search converting switch control signal;

generating a first focus ON signal based on the first focus servo lead-in control signal during the first focus search operation;

generating a second focus ON signal based on the second focus servo lead-in control signal during the second focus search operation;

selecting an output between the selected signal and the focus servo signal based on one of the first and the second focus ON signals, and supplying the output to a focus servo actuator; and operating the object lens in a direction of an optical axis of the optical beam based on the output supplied to the focus servo actuator, wherein, if a focus servo is led in by using the optical beam having the first wavelength, the focus servo is led in by using the second focus ON signal and if the focus servo is led in by using the optical beam having the second wavelength, the focus servo is led in by using the first focus ON signal, and wherein the first wavelength is different from the second wavelength.

8. The optical information reproduction method of claim 7, wherein, if the type of said one of the information recording media is identified, the focus servo is led in by using the first or the second focus ON signal by employing the optical beam having a wavelength corresponding to the type of said one of the information recording media.

9. The optical information reproduction method of claim 7, wherein the first wavelength is shorter than the second wavelength.

10. The optical information reproduction method of claim 7, wherein the first information recording medium is a digital versatile disc (DVD), and the optical beam source of the first wavelength has a wavelength of about 650 nm to access the DVD.

11. The optical information reproduction method of claim 7, wherein the second information recording medium is a compact disc (CD), and the optical beam source of the second wavelength has a wavelength of about 780 nm to access the CD.

* * * * *